United States Patent [19]

Jung

[11] Patent Number: 5,105,682
[45] Date of Patent: Apr. 21, 1992

[54] ARRANGEMENT FOR THE DETACHABLE COUPLING OF A BRAKE CABLE LINE

[75] Inventor: Hubert Jung, Frankfurt am Main, Fed. Rep. of Germany

[73] Assignee: Alfred Teves GmbH, Frankfurt am Main, Fed. Rep. of Germany

[21] Appl. No.: 668,527

[22] Filed: Mar. 13, 1991

[30] Foreign Application Priority Data

Mar. 13, 1990 [DE] Fed. Rep. of Germany ....... 4007954

[51] Int. Cl.$^5$ .............................................. F16D 9/00
[52] U.S. Cl. .................................................. 74/502.4
[58] Field of Search ...................... 74/502.4, 500.5, 491

[56] References Cited

U.S. PATENT DOCUMENTS

| | | | |
|---|---|---|---|
| 2,845,812 | 8/1958 | Pobar | 74/502.4 |
| 3,101,205 | 8/1963 | Benham | 74/502.4 X |
| 3,248,882 | 5/1966 | Rossa | 74/502.4 X |
| 4,339,213 | 7/1982 | Gilmore | 403/316 |
| 4,458,552 | 7/1984 | Spease et al. | 74/502.4 |
| 4,621,937 | 11/1986 | Maccuaig | 74/502.4 X |
| 4,889,005 | 12/1989 | Crack | 74/502.4 X |
| 4,963,050 | 10/1990 | Wendt et al. | 74/502.4 X |

FOREIGN PATENT DOCUMENTS

| | | | |
|---|---|---|---|
| 2314598 | 10/1973 | Fed. Rep. of Germany | 74/502.4 |
| 1154433 | 6/1969 | United Kingdom . | |
| 2087015 | 5/1982 | United Kingdom . | |
| 2230323 | 10/1990 | United Kingdom . | |

Primary Examiner—Leslie A. Braun
Assistant Examiner—William O. Trousdell
Attorney, Agent, or Firm—Robert P. Seitter; J. Gordon Lewis

[57] ABSTRACT

An arrangement is disclosed for the detachable coupling connection of a brake cable line (2) to a fixed buffer block (8) spaced from an expanding lever brake (4), an encasing pipe assembly (5) surround the cable line (21). The encasing pipe assembly (5) may be two-part construction, a cable socket (6) and a thrust bushing (7) being adapted to be telescoped one over the other and secured together to be clamped to the buffer block (8). A fixing element (13) is attached to the cable (2) and a sliding bushing is fit over the fixing element, on interposed spring (21) and seal (27) fit over the cable (2) and extending between the buffer block (8) and lever (4). A number of encasing pipe assembly designs are described.

14 Claims, 4 Drawing Sheets

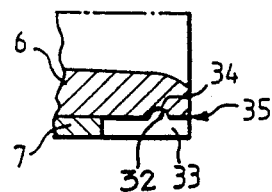
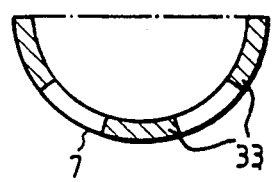
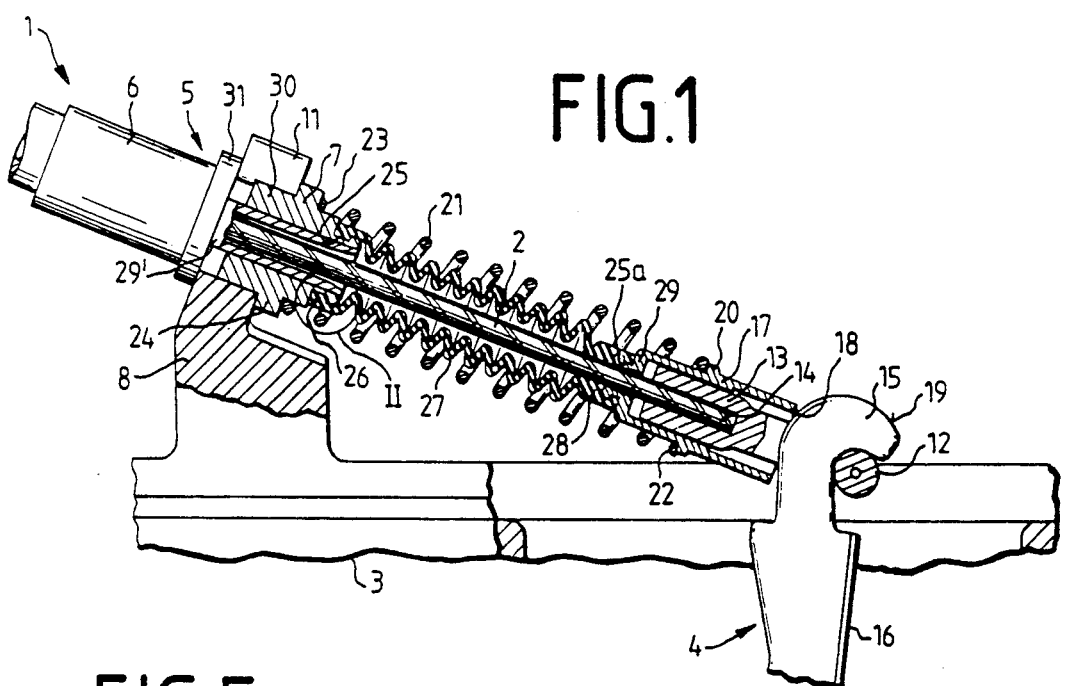
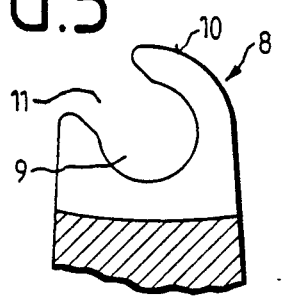
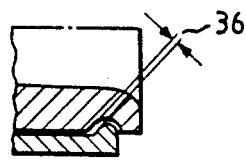

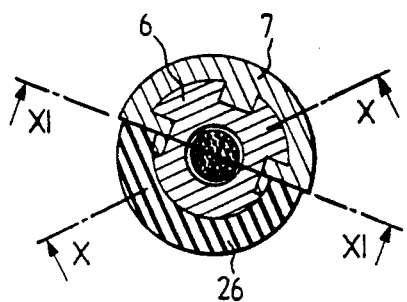
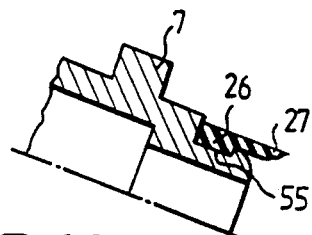
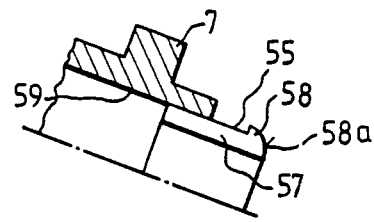
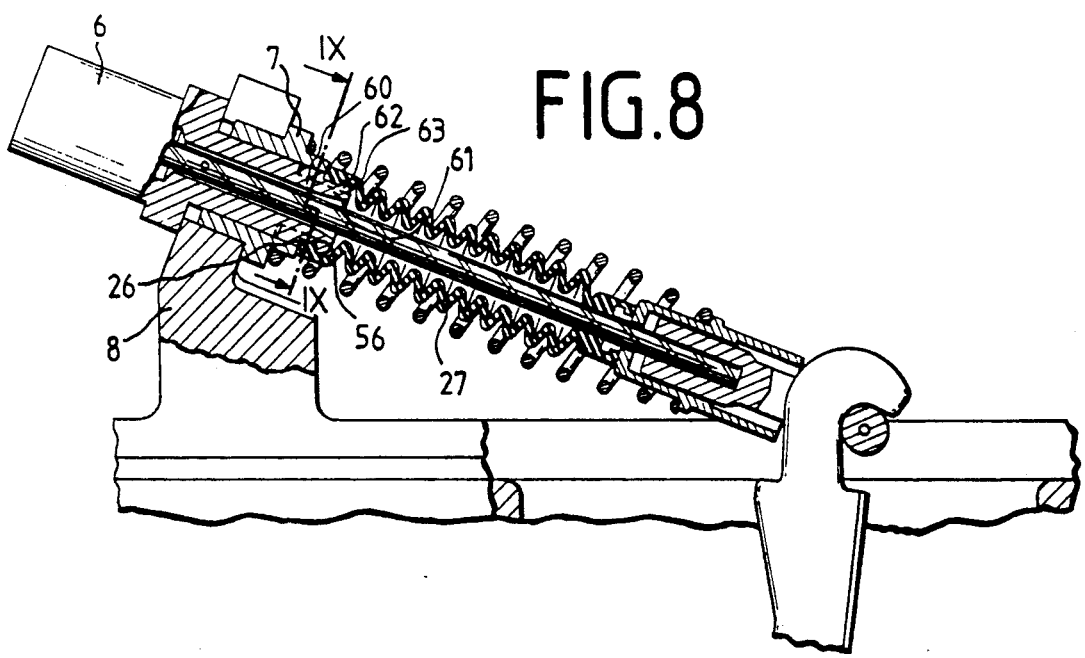

ARRANGEMENT FOR THE DETACHABLE COUPLING OF A BRAKE CABLE LINE

INTRODUCTION

The invention is related to an arrangement for the detachable connecting or coupling a brake cable line to an anchor plate of an expanding lever brake.

BACKGROUND OF THE INVENTION

A brake cable line securing apparatus of this kind is known from the German patent application published without examination, No. 3,428,134. In that patent application, a suspension ear of an end of a brake cable line is passed through a socket of an anchor plate. An encasing pipe of the cable line end is retained at the socket of the anchor plate with the aid of a retaining clasp. Disadvantageously the clasp is supplied additionally to the assembly line, and the brake is completed to a unit only when the cable line is being assembled. The clasp constitutes an additional element to be assembled which presents a safety problem in case of a faulty assembly.

BRIEF DESCRIPTION OF THE INVENTION

The invention has, therefore, the object to simplify the assembly of a cable line end to a brake.

Along the lines of these solutions, the retaining clasp is eliminated; any faulty assembly is thus avoided by the arrangement according to the invention.

The arrangement includes a pipe encasing assembly and a buffer block fixed spaced apart from the lever to which the cable is to be connected. A fixing element configured to catch the lever is attached to the cable end. A sliding bushing is fit over the fixing element, while the pipe encasing assembly is detachably secured or latched in an opening in the buffer block. A spring is interposed between the sliding bushing and a seal encloses the exposed cable extending between the buffer block and fixing element. The cable casing is received in a socket of the pipe encasing assembly. For the purpose of latching, a thrust bushing including in the encasing pipe assembly is retracted against the spring force, respectively the loose cable, and a cable socket also included in the encasing pipe assembly is inserted at the portion having a smaller diameter into an opening in the buffer block. The sliding bushing is allowed to slide back and is secured due to the spring force. The thrust bushing locks with fingers to the cable socket. The advantages resulting from the above are an easy and safe assembly which is appropriate in particular where a compact design is required. This provides an integrated arrangement without necessitating a large number of individual components which may not be stacked. The component parts may be manufactured of plastic material. Along these lines, the end of the brake cable line is preassembled as one unit, and as a result no components will additionally be required during the assembly on the assembly line.

In a first embodiment claim 1, an encasing pipe is designed two-part construction comprising the cable socket and the thrust bushing which are inserted into the buffer block opening laterally through a slot, and are subsequently telescoped one over the other, so that the encasing pipe assembly as a whole is detachably clamped in the buffer block.

In a second embodiment claim 2, the encasing pipe is provided with elastic spring latches which are introducible through the opening of the buffer block being designed in the shape of a bore without slot, the latches detachably locking at the buffer block.

According to a third embodiment, a spring acting radially in respect of the encasing pipe is retained in a slot of the anchor plate. The interposed spring resists the braking effect on the end of brake operation and brings about a certain restoring effect. Furthermore, the spring fosters the abutment of the thrust bushing against the buffer block and accommodates tolerances.

Also, the sliding bushing is, thereby always abutted against the lever of the expanding lever brake, so that, on one hand, less mud may penetrate there from the side of the cable end, and, on the other hand, the sliding bushing wipes at the lever, so that the lever is retained at this point free of corrosion and a contact without play between the lever and the suspension ear is ensured.

The sealing sleeve which extends within said spring from the encasing pipe to the sliding bushing and which sealingly surrounds the cable line advantageously protects said cable line and also the interior space of the encasing pipe from mud.

In another embodiment, the sleeve sealingly engages with an end section a circumferential groove of the thrust bushing and of the sliding bushing, so that the sleeve is adapted easily to be slid onto the cable socket together with the thrust bushing upon the insertion of the encasing pipe into the buffer block.

In a further advantageous embodiment, an end section of said sealing sleeve engages a circumferential groove of the cable socket. In this configuration, first of all the encasing pipe is inserted into the buffer block, subsequently the thrust bushing is slid onto the cable socket, the spring is pushed back, and the end section is inserted into the cable socket. In this context, said end section is suitably designed so as to clamp the thrust bushing at the cable socket, respectively at the buffer block. With the end section inserted in the circumferential groove of the socket, a balancing of the axial play between the socket and the casin is achieved, since the end of the sealing sleeve may be manufactured from resiliently yielding material. Any penetration of mud through clearances between the cable socket and the thrust bushing is excluded because of the direct sealing coupling between the socket and the sleeve.

In yet another embodiment, the end section is adapted to be accommodated in a circumferential groove both of the thrust bushing and of the cable socket. In that configuration, the end section is slid over conically designed elastic latch fingers of the thrust bushing and allows first of all to be accommodated in the circumferential groove of the thrust bushing which is partly provided with radial openings. Thereupon, the thrust bushing is slid with the end section onto the cable socket. During this procedure, the end section passes over radially open, cone-shaped latches and subsequently clamps in the circumferential groove of the cable socket.

In one advantageous embodiment of the invention, the thrust bushing and the cable socket are locked to each other by means of latches. In this context, the locking allows some end play so that the spring may urge the thrust bushing against the buffer block the latches designed to seat in the locking groove with a clearance to allow the end play. The locking takes place automatically by a spring force and may be assisted manually. The latches are positioned on elastic, prestressed levers and are designed clip-shaped as anti-failure safety means.

It is envisaged according to another advantageous embodiment that the cable socket and the thrust bushing are locked to each other by means of a snap retainer, i.e., circlip.

An O-ring seal between the cable socket and the thrust bushing advantageously prevents the penetration of mud.

In another simple embodiment, the thrust bushing is of two-part construction, a first part of said thrust bushing accommodating the end section of the sleeve and the second part serving as a support for the spring. In this configuration, first of all the first part of the thrust bushing is preassembled with the sleeve. Only thereafter the second part of the thrust bushing which bears the spring is locked to the first part by means of a circlip and is brought into abutment against the buffer block with stops.

In the following, embodiments of the invention will be described in more detail with reference to accompanying drawings.

BRIEF DESCRIPTION OF THE DRAWINGS

FIG. 1, is a longitudinal section view of a cable line fixing arrangement with a two-part encasing pipe and with a locking of both parts by means of sprung latches;

FIG. 2 is a fragmentary enlarged view of the end of the cable socket and thrust bushing in circle II of FIG. 1, showing the locking between the cable socket and the thrust bushing;

FIG. 3 is a fragmentary cross sectional view of the cable socket;

FIG. 4 is an enlarged fragmentary sectional view of the end of the cable socket and thrust bushing showing the end play clearance;

FIG. 5 is a fragmentary end top view of a slotted buffer block;

FIG. 8, is a cross sectional view of end sections of the sealing sleeve in a circumferential groove of the cable socket, of the thrust bushing and of the sliding bushing;

FIG. 9 is a cross sectional view of the end section of the sealing sleeve in a circumferential groove of the cable socket and of the thrust bushing;

FIG. 10 is a longitudinal sectional view of the thrust bushing along taken the line X—X in FIG. 9;

FIG. 11 is a longitudinal sectional view of the thrust bushing with the end section of the sealing sleeve along the line XI—XI in FIG. 9;

DETAILED DESCRIPTION OF THE INVENTION

Figure 6:
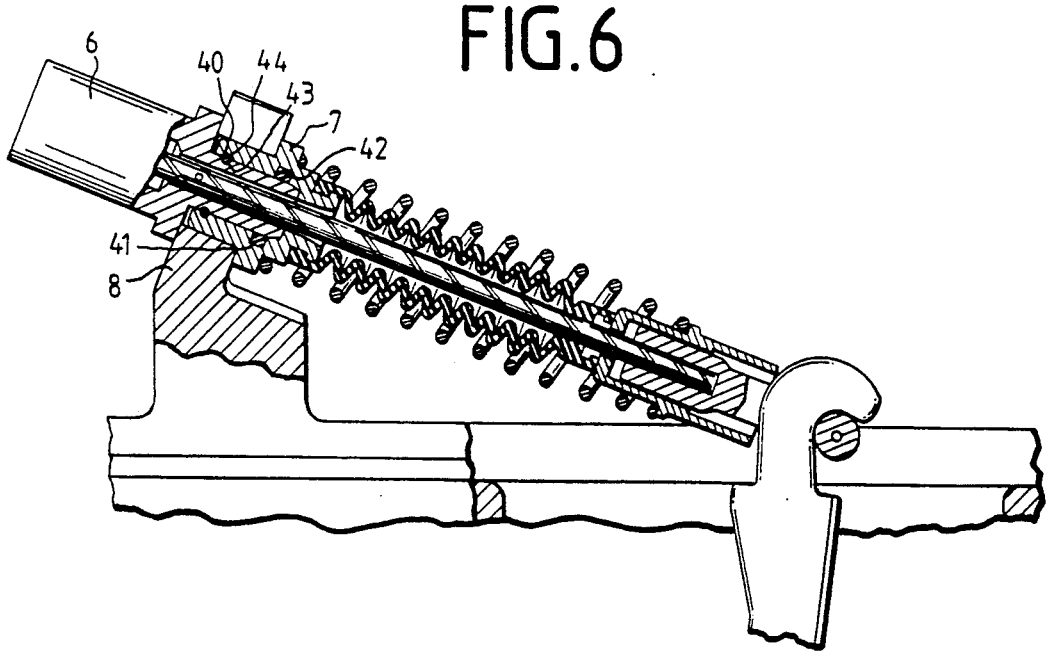
FIG. 6 is a longitudinal sectional view of a cable line fixing arrangement with a two-part encasing pipe and with a further locking of the two parts by means of a circlip.

In the Figures, identical components, respectively components corresponding to one another, are given identical reference numerals for reasons of clearness.

FIGS. 1 to 5 show an arrangement 1 for the detachable connecting or coupling of a brake cable line 2 to an anchor plate 3 of an expanding lever brake, an encasing pipe assembly 5 surrounding said cable line 2. The encasing pipe assembly 5 is here designed of two-part construction, comprising a cable socket 6 and a thrust bushing 7 being telescopable one over the other. A buffer block 8 of the anchor plate 3 which accommodates the encasing pipe 5 is designed with a through opening 9 and with a slot 11 which extends radially from the opening up to the peripheral surface 10 of the buffer block 8. With its cable fixing element 13, a suspension ear 12 clamps a cable end 14. The suspension ear 12 catches behind a lever 15 of an expanding block 16. The securing element 13 is surrounded by a sliding bushing 17 which is supported on said cable fixing element 13 axially movably in respect of the cable line 2. With its front side 18 facing said lever 12, the sliding bushing 17 is supported at a peripheral surface 19 of rounded shape of said lever 15. At a radially extending peripheral shoulder 20 of the sliding bushing 17 a spring 21 is engaged at a first end 22, which spring 21 engages with its other end 23 a radially extending peripheral flange 24 of the thrust bushing 7. The thrust bushing 7 is formed with a circumferential groove 25 which is open outwardly in radial direction and which is engaged by an end section 26 of a sealing sleeve 27. With its second section 28, the sealing sleeve 27 is abutted against a bottom 29 of said sliding bushing 17 and against the circumference of the cable line 2, and it surrounds said cable line 2 in a sealing manner. The second end section 28 engages a circumferential groove 25a of said sliding bushing 71. During the insertion of the encasing pipe 5, the cable socket 6 and the thrust bushing 7 are separated from each other in axial direction, so that a smaller diameter extension 29' of the cable socket 6 is adapted to be inserted through the slot 11 into the opening 9 of the buffer block 8. Subsequently, the thrust bushing 7 is pushed over the socket extension 29, so that with its larger diameter portion 30, the thrust bushing 7 moves into the opening 9. In this configuration, the diameters of the portion 30 and of the opening 9 are of substantially equal size. In this manner the encasing pipe 5 will come to be clamped in the buffer block (stick-slide closure). Flanges 24, 31 of the encasing pipe assembly 5 secure the cable socket 6 and the thrust bushing 7 axially in respect of the buffer block 8. Elastic latches 32 at levers 33 of said thrust bushing 7 clamp within a rounded groove 34 of said cable socket 6 and form a clip-type closure 35. The flanges 24, 31, latches 32, and said groove 34 are dimensioned such that end play 36 remains in the groove 34 and that the abutment of the flanges 24, 31 against the buffer block 8 is substantially ensured by the force of the spring 21.

FIG. 6 shows a fixation between the socket 6 and the thrust bushing 7 by means of a snap retainer, circlip 40. In addition, a sealing ring 42 is inserted in a radially inwardly open circumferential groove 41 of said thrust bushing 7. The sealing ring 42 prevents the penetration of mud. The circlip 40 is seated in the bore 9 within said buffer block 8 and is inserted in an outwardly open rounded circumferential groove 43 of the socket 6 and in an inwardly open rounded circumferential groove 44 of the thrust bushing 7.

Figure 7:
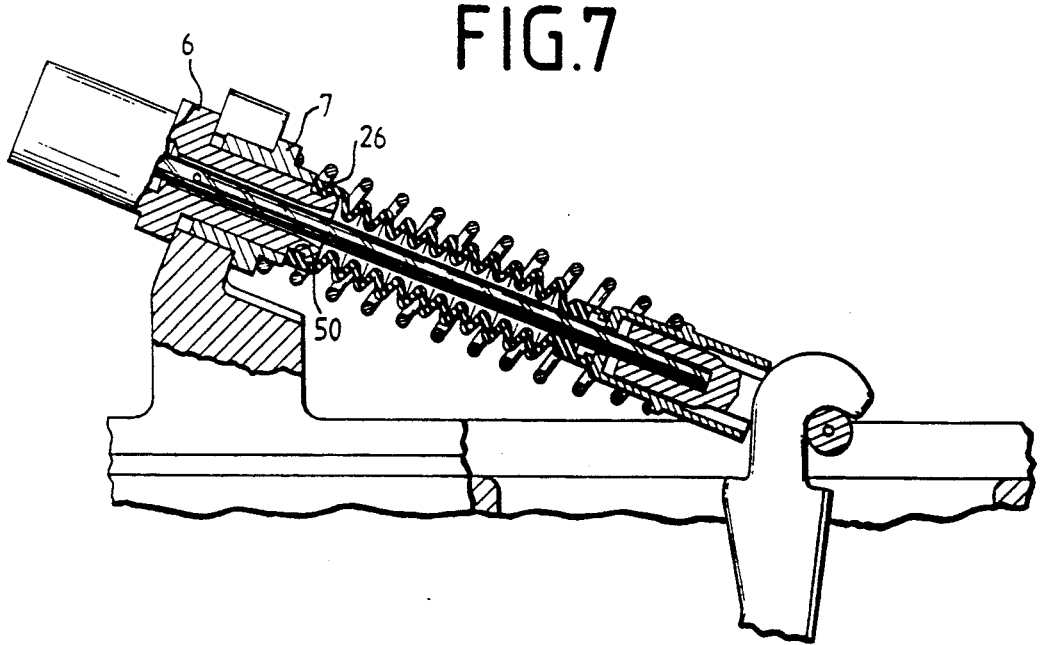
FIG. 7, is a longitudinal sectional view of a cable line fixing arrangement with a two-part encasing pipe and with a third locking of the two parts by means of an end section of a sealing sleeve.

FIG. 7 shows the end section 26 in a circumferential groove 50 of the cable socket 6. In this configuration, during assembly first the bushing 7 is slid onto the socket 6 and thereupon the end section 26 is inserted into the circumferential groove 50. The end section 26 is inserted into the circumferential groove 50 in such a manner that is axially secures the socket 6 and the thrust bushing 7 at the buffer block 8 in.

FIGS. 8, 9, 10, and 11 show the end section 26 of the sealing sleeve 27 in a circumferential groove 55, 56 which is partly formed by the thrust bushing 7 and partly by the socket 6. In this configuration, the thrust bushing 7 is furnished with axially extending, radially elastic levers 57 uniformly distributed over the circumference with latches 58 which jointly with the remaining range 59 of the thrust bushing 7 form circumferential groove 55 into which the end section 26 is introducible. The levers 57 engage the socket 6 in radial directions which latter is formed with matching gaps in its axial end range 60. The socket 7 and the sealing sleeve 27 are slid in axial direction over latches 62 at radially elastic levers 61 of the socket 6. In this way, the end section 26 clamps the socket and the bushing against each other axially and secures the two elements in respect of each other.

Figure 12:
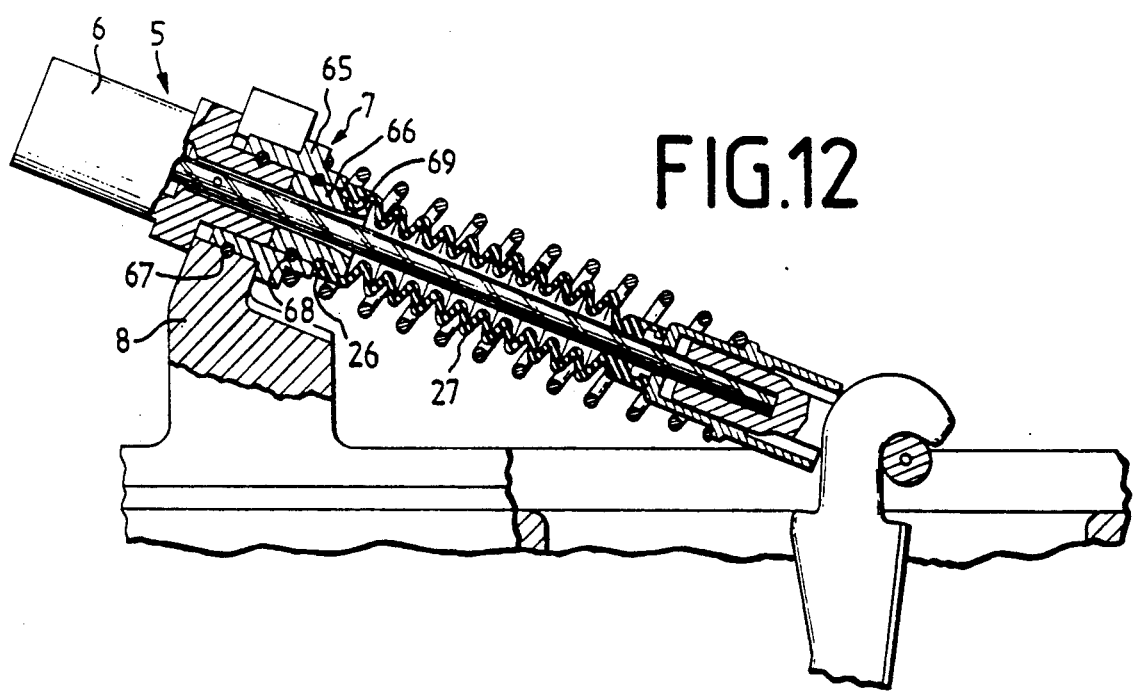
FIG. 12 is a longitudinal sectional view of a cable line fixing apparatus with a three-part encasing pipe.

FIG. 12 shows a three-part encasing pipe, the thrust bushing 7 being configured of two parts comprising a spring part 65 and a sleeve part 66. With a first circlip 67, the spring part 65 is secured axially at the buffer block 8, and with a second circlip 68 it secures the sleeve part 66 axially. The spring part 65 presents a constant internal diameter over its total axial length. In this context, the socket 6 is introduced from the socket side and the sleeve part 66 from the lever side, the sleeve part 66 retaining the end section 26 in circumferential groove 69. At the front side, the end section 26 is abutted against the spring part 65 of the thrust bushing 7. The sleeve part 66 is seated in the spring part 65 in the shape of a latch-type fixation.

Figure 13:
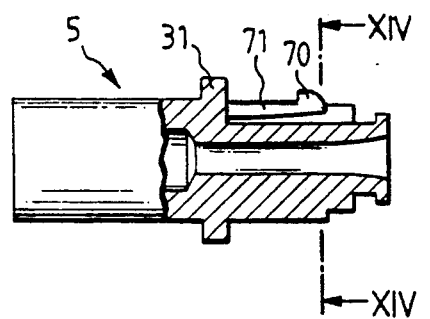
FIG. 13 is a longitudinal sectional view of a one-part encasing pipe with sprung latches.
Figure 14:
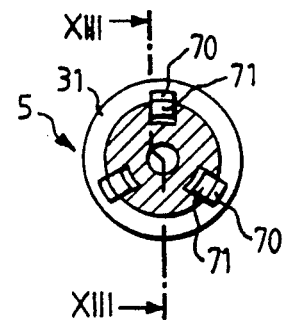
FIG. 14 is a cross sectional view of the encasing pipe according to FIG. 13.

FIGS. 13, 14 show an encasing pipe assembly 5 with latches 70 which are positioned radially elastically at levers 71. The encasing pipe assembly 5 is introducible into the bore 9 of the buffer block 8 in axial direction. A slot 11 may be foregone for this purpose. With its latches 70 and the attachment 31, the encasing pipe assembly 5 clamps at the front surfaces of the buffer block 8.

Figure 15:
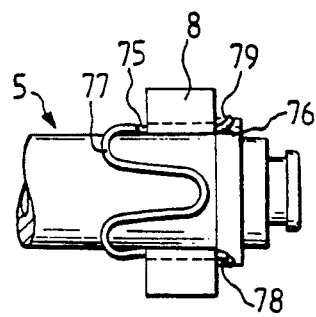
FIG. 15 is a top view of an encasing pipe with spring safety device in a buffer block.
Figure 16:
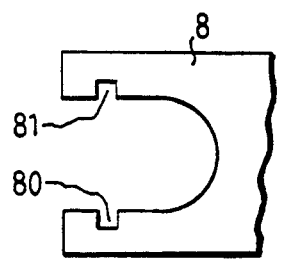
FIG. 16 is a fragmentary end view of the slotted buffer block with grooves included in FIG. 15.

FIGS. 15, 16 show an encasing pipe assembly 5 which is secured with axial stops 75, 76 in a buffer block 8 in axial direction. The encasing pipe assembly 5 is inserted into the buffer block 8 through a slot extending in a radial direction, and is radially secured and retained with the aid of a spring 77 which is bent to W-shape and whose external legs 78, 79 engage grooves 80, 81.

What is claimed is:

1. An arrangement for detachably connecting a cable having a casing to a movable lever, comprising:
   a cable fixing element attached to the end of said cable, and engaged with said lever;
   a fixed buffer block spaced away from said lever, and having a through opening extending therethrough from one side to another side;
   an encasing pipe assembly mounting within said buffer block opening and means for axially securing said encasing pipe assembly to said buffer block;
   said encasing pipe assembly having a socket portion at one end having an opening receiving said casing of said cable, and formed with a smaller diameter through opening through which said cable passes in extending to said cable fixing element;
   a sliding bushing slidably received over said cable fixing element;
   a spring interposed between said sliding bushing and said encasing pipe assembly; and
   an elongated seal surrounding said cable, one end of said seal secured to said encasing pipe assembly and the other end secured to said sliding bushing.

2. The arrangement according to claim 1, wherein said encasing pipe assembly includes a cable socket and a thrust bushing, said cable socket having said socket portion at one end receiving said cable casing, said cable socket having an extension of smaller diameter than said buffer block opening and extending therethrough from one side thereof, and also having a flange portion of larger diameter than said buffer block opening adjacent said extension and abutted against said one side of said buffer block, said thrust bushing having a bore receiving said cable socket extension to be telescoped over said cable socket extension and having a flange of larger diameter than said buffer block opening abutted against said another side of said buffer block, and securing means detachably securing said cable socket and flange bushing together against relative axial movement.

3. The arrangement according to claim 2 wherein said buffer block has a slot extending into said opening, wherein said slot adapted to allow said cable socket extension to pass laterally into said opening.

4. The arrangement according to claim 2 wherein said securing means comprises a series of latch fingers on one of said cable socket or thrust bushing and mating recesses on the other of said cable socket or thrust bushing.

5. The arrangement according to claim 2 wherein a portion of said cable socket extension protrudes past an end of said thrust bushing away from said buffer block, and a circumferential groove is formed in said protruding portion of said extension adjacent said thrust bushing end, and wherein said one end of said seal is fit into said groove to secure said cable socket and thrust bushing against relative axial movement.

6. The arrangement according to claim 2 wherein said interposed spring engages said thrust bushing flange, and wherein said securing means allows a limited axial movement between said cable socket and thrust bushing, whereby said interposed spring can urge said thrust bushing flange against said other side of said buffer block.

7. The arrangement according to claim 2 wherein said securing means comprises a snap fit retainer inserted in aligned grooves in said cable socket extension and said thrust bushing bore.

8. The arrangement according to claim 7 further including a seal between said cable socket extension and said thrust bushing bore.

9. The arrangement according to claim 2 wherein said cable socket extension and said thrust bushing are formed with axially extending interfit fingers, said interfit fingers jointly formed with a circumferential groove, and wherein said one end of said seal is interfit into said groove to axially secure together said cable socket and thrust bushing.

10. The arrangement according to claim 1 wherein said encasing cable assembly includes an element insertable into said buffer block opening, and a series of spring fingers axially extending from said element to protrude through said opening and having end portions urged radially outward to secure said element to said buffer block.

11. The arrangement according to claim 1 wherein said buffer block has a slot extending radially into said buffer block opening, a pair of grooves extending into the sides of said slot, and wherein said encasing pipe assembly includes an element inserted radially into said opening and having a radial flange larger than said opening, and also includes a W-spring having a pair of legs extending through a respective groove, each leg having a radially outturned tip terminating adjacent said radial flange.

12. The arrangement according to claim 2 wherein said thrust bushing has two parts, a spring part formed with said bore and a sleeve part received within a portion of said bore and concentric with said cable socket extension, a snap fit retainer assembled between said spring part and said extension and another snap fit retainer assembled between said sleeve part and said spring part.

13. The arrangement according to claim 1 wherein said sliding bushing is urged into engagement with said lever by said opening.

14. An arrangement for detachably connecting an encased cable to a lever, comprising:

a cable fixing element attached to the end of said cable, said cable fixing element configured to capture said lever;

a fixed buffer block spaced away from said lever and having an opening extending therethrough;

an encasing pipe assembly mounted within said buffer block opening, said encasing pipe assembly including a cable socket having a socket at one end receiving an end of said casing of said cable, and formed with an extension portion extending from said socket, and passing through said buffer block opening and a flange surrounding abutting against one side of said buffer block, said casing pipe assembly further including a thrust bushing having a portion formed with a bore receiving said cable socket extension, said thrust bushing portion fit into said buffer block bore and formed with a surrounding flange abutting another side of said buffer block;

securing means detachably latching said cable socket and thrust bushing together axially;

said casing pipe assembly having a relatively small diameter passage through which said cable passes in extending to said lever and cable fixing element;

a sliding bushing slidably received over said cable fixing element; and a spring surrounding said cable and interposed between said buffer block and said sliding bushing.

* * * * *